(12) United States Patent
Coresh

(10) Patent No.: US 11,541,560 B2
(45) Date of Patent: Jan. 3, 2023

(54) PRECISION RAZOR WITH LOW COST ASSEMBLY

(71) Applicant: Rolling Razor, Inc., Los Angeles, CA (US)

(72) Inventor: Leon Coresh, Tel Aviv (IL)

(73) Assignee: Rolling Razor, INc., Log Angeles, CA (US)

( * ) Notice: Subject to any disclaimer, the term of this patent is extended or adjusted under 35 U.S.C. 154(b) by 611 days.

(21) Appl. No.: 15/909,816

(22) Filed: Mar. 1, 2018

(65) Prior Publication Data

US 2019/0270210 A1 Sep. 5, 2019

(51) Int. Cl.
*B26B 21/22* (2006.01)
*B26B 21/40* (2006.01)
(Continued)

(52) U.S. Cl.
CPC ........ *B26B 21/4012* (2013.01); *B26B 21/225* (2013.01); *B26B 21/4018* (2013.01); *B26B 21/4068* (2013.01); *B26B 21/521* (2013.01); *B29C 65/606* (2013.01); *B29C 65/64* (2013.01); *B29C 66/124* (2013.01);
(Continued)

(58) Field of Classification Search
CPC .............. B26B 21/4012; B26B 21/225; B26B 21/4018; B26B 21/4068; B26B 21/521; B29C 65/606; B29C 65/64; B29C 65/124; B29C 65/30321; B29C 65/474; B29D 99/0025
See application file for complete search history.

(56) References Cited

U.S. PATENT DOCUMENTS 3,138,865 A 6/1964 Meyer
3,815,233 A * 6/1974 Carroll ................. B26B 21/165
30/47

(Continued)

FOREIGN PATENT DOCUMENTS

CN 1212647 3/1999
CN 1469797 1/2004
(Continued)

OTHER PUBLICATIONS

Partial European Search Report dated Jul. 12, 2019.
Extended European Search Report dated Oct. 7, 2019.

*Primary Examiner* — Evan H MacFarlane
*Assistant Examiner* — Liang Dong
(74) *Attorney, Agent, or Firm* — Thomas Coester Intellectual Property

(57) ABSTRACT

A precision shaving razor with low cost assembly. A bridge is unitarily molded having a leading platform, a handle attachment mechanism and first and a second cross member each molded to extend substantially perpendicularly to the leading platform. A plurality of base members is each unitarily molded to have a first peg and a second peg for attachment to the cross pieces. A plurality of blade covers each unitarily molded. A razor blade is sandwiched between each blade cover-base pair. In some instances, the blade covers are molded to have hard stops to facilitate precise blade position. In some cases, the bases define angular wash through channels and blade guards spaced to facilitate wash through. In some cases, the skin contacting surfaces of the razor are textured during molding to have a glide improving texture.

13 Claims, 8 Drawing Sheets

(51) Int. Cl.
  *B26B 21/52* (2006.01)
  *B29C 65/60* (2006.01)
  *B29C 65/64* (2006.01)
  *B29C 65/00* (2006.01)
  *B29D 99/00* (2010.01)

(52) U.S. Cl.
  CPC ...... *B29C 66/30321* (2013.01); *B29C 66/474* (2013.01); *B29D 99/0025* (2013.01)

(56) References Cited

U.S. PATENT DOCUMENTS

| | | | |
|---|---|---|---|
| 4,170,821 A | 10/1979 | Booth | |
| 4,403,412 A * | 9/1983 | Trotta | B26B 21/227 30/47 |
| 4,516,320 A | 5/1985 | Peleckis | |
| 4,932,122 A | 6/1990 | Shurland et al. | |
| 5,038,472 A | 8/1991 | Iderosa | |
| 5,152,064 A | 10/1992 | Johnston | |
| 5,426,853 A | 1/1995 | McNinch | |
| 5,430,939 A * | 7/1995 | Johnston | B26B 21/443 30/41 |
| 5,456,009 A | 10/1995 | Wexler | |
| 5,711,076 A | 1/1998 | Yin et al. | |
| 5,781,997 A | 7/1998 | Ferraro et al. | |
| 6,161,288 A | 12/2000 | Andrews | |
| 6,212,777 B1 | 4/2001 | Gilder et al. | |
| 6,216,345 B1 | 4/2001 | Andrews | |
| 6,243,951 B1 | 6/2001 | Oldroyd | |
| 6,311,400 B1 | 11/2001 | Hawes et al. | |
| 6,397,473 B1 | 6/2002 | Clark | |
| 6,434,828 B1 | 8/2002 | Andrews | |
| 6,880,253 B1 | 4/2005 | Gyllerstrom | |
| 7,111,401 B2 | 9/2006 | Richard | |
| 7,131,203 B2 * | 11/2006 | Wain | B26B 21/227 30/57 |
| 7,210,229 B2 | 5/2007 | Coffin | |
| 8,136,249 B2 | 3/2012 | Shiba | |
| 9,868,220 B2 * | 1/2018 | Moffat | B26B 21/227 |
| 2004/0181949 A1 | 9/2004 | Coffin et al. | |
| 2005/0188539 A1 | 9/2005 | Prudden | |
| 2005/0198843 A1 | 9/2005 | Royle | |
| 2006/0064875 A1 | 3/2006 | Follo et al. | |
| 2006/0080839 A1 | 4/2006 | Hesketh | |
| 2006/0143925 A1 | 7/2006 | Johnson et al. | |
| 2006/0196054 A1 | 9/2006 | Luxton | |
| 2008/0196251 A1 | 8/2008 | Royle | |
| 2009/0288299 A1 | 11/2009 | Denkert | |
| 2010/0058595 A1 | 3/2010 | Walker, Jr. | |
| 2011/0016724 A1 | 1/2011 | Murgida | |
| 2011/0088269 A1 | 4/2011 | Walker, Jr. | |
| 2011/0192031 A1 | 8/2011 | Coresh | |
| 2012/0030948 A1 | 2/2012 | Walker, Jr. et al. | |
| 2012/0151772 A1 | 6/2012 | Moon et al. | |
| 2012/0324733 A1 | 12/2012 | Coresh | |
| 2013/0000127 A1 * | 1/2013 | Coresh | B26B 21/22 30/41 |
| 2014/0259677 A1 | 9/2014 | Coresh | |
| 2014/0366381 A1 * | 12/2014 | Phipps | B26B 21/4012 30/41 |
| 2018/0014855 A1 * | 1/2018 | Beijens | A61B 17/54 |

FOREIGN PATENT DOCUMENTS

| | | |
|---|---|---|
| DE | 102009050344 | 5/2011 |
| EP | 0020816 | 1/1981 |
| EP | 1046472 | 10/2000 |
| EP | 1252983 | 10/2002 |
| EP | 1674220 | 6/2006 |
| GB | 2268434 | 1/1994 |
| GB | 2411141 | 8/2005 |
| GB | 2507971 | 11/2012 |
| WO | 9408761 | 4/1994 |
| WO | 9509071 | 4/1995 |
| WO | 200232632 | 4/2002 |
| WO | 2004087382 | 10/2004 |
| WO | 2005058558 | 6/2005 |
| WO | 2005090020 | 9/2005 |
| WO | 2006036591 | 5/2006 |
| WO | 2010010517 | 1/2010 |

* cited by examiner

PRECISION RAZOR WITH LOW COST ASSEMBLY

BACKGROUND

Field

A personal care item, more particularly a shaving device.

Background

A diversity of shaving means is available on the market, for example manually operated, electric shavers, multiple use and disposable shaving devices. Typically, such shaving devices include a gripping handle for conveniently holding one or more cutting blades and a respective cartridge bearing one or more of those blades, secured within. Many of these devices include numerous blades and a host of small part such the manufacture is complex and expensive. Efforts to reduce the cost of razor manufacture have been hamper by the required precision to insure blade positioning and shaving comfort demanded by the market place.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration.

Figure 1:
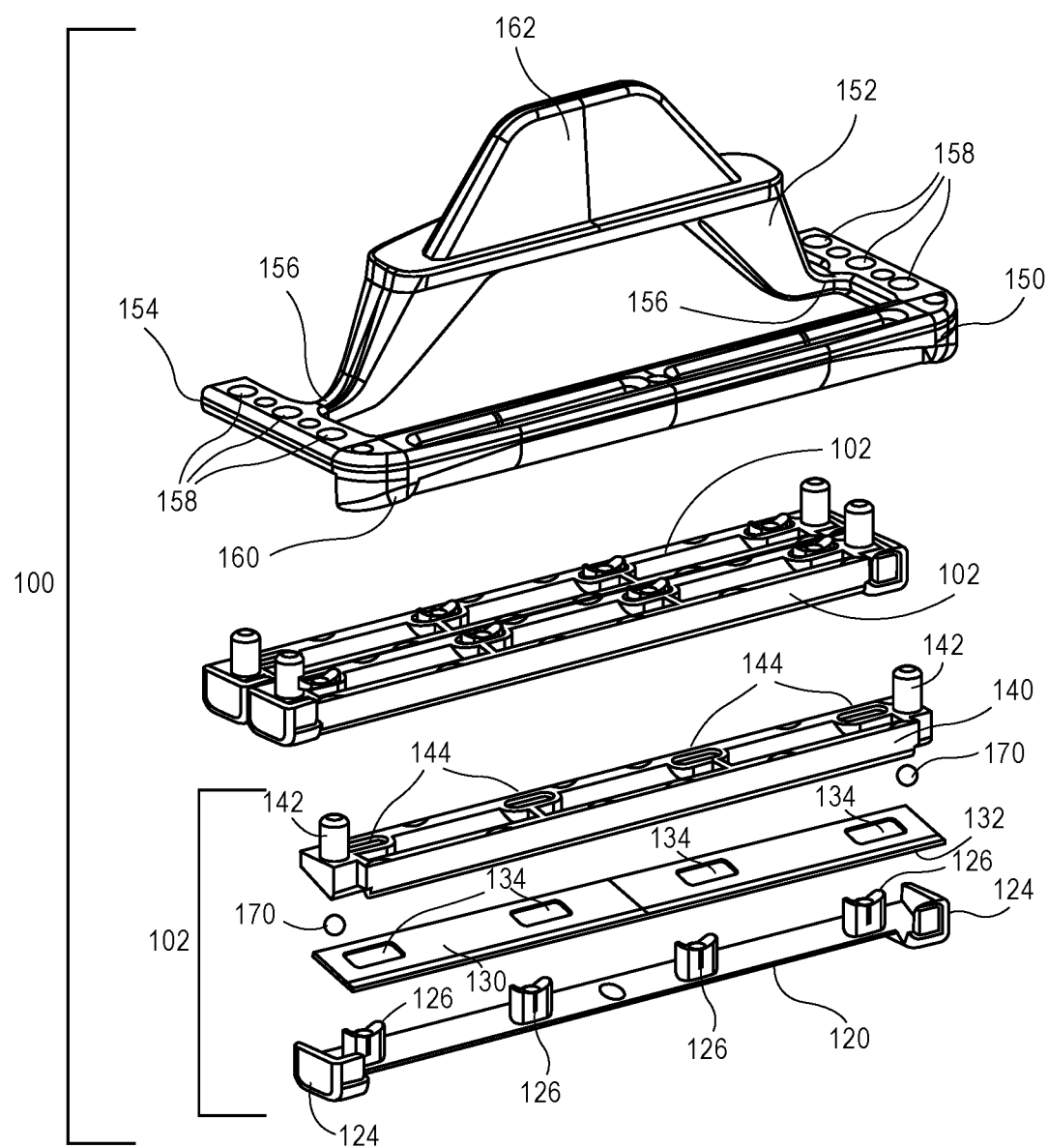
FIG. 1 is an exploded view of a shaving head according to one embodiment of the invention.

FIG. 1 is an exploded view of a shaving head according to one embodiment of the invention. Shaving head 100 is made up of a unitarily molded bridge 150 and a plurality of blade assemblies 102 that couple thereto. While three blade assemblies 102 are shown, more or fewer blade assemblies 102 are within the scope and contemplation of embodiments of the invention. For example, two, four or five blade assemblies 102 could be used in various embodiments of the invention. Bridge 150 is molded to have a yoke 152 that spans between two cross pieces 154 on to which blade assemblies 102 may be installed. Bridge 150 also includes a leading platform 160 that extends from a front edge of cross pieces 154 and coupled the cross pieces 154 together. As used herein, "leading" refers to earlier in position relative to the direction of shaving. Similarly, used herein infra "forward tilt" refers to clockwise motion relative to the shaving plane and "backward tilt" refers to counterclockwise motion relative to the shaving plane.

In one embodiment, cross pieces 154 are molded to be flexible under external force into convex orientation (described more fully below with reference to FIGS. 5A and 5B). It is preferred that the cross pieces have sufficient resilience to return to a substantially planar orientation when not subject to a force. That is, in the rest position the cross pieces 154 will be substantially planar. In various embodiments, cross pieces 154 (and bridge 150) may be formed from commercially available elastomeric nylon 12, polyurethane, or any other suitably resilient synthetic material. Generally, it is desirable for cross piece 154 to have sufficient resilience to deform and return to its generally planar original state for at least 8000 cycles. Resilience of 10,000 cycles or more is preferred.

Cross pieces 154 are molded to define a plurality of bores 158. The number of bores 158 in each cross piece 154 is dictated by the number of blade assemblies 102 desired to be part of the shaving head 100. Bridge 150 also defines a handle attachment mechanism 162 that permits selective coupling of the razor head 100 to a handle (not shown). Numerous handles such as stick handles, ring handles, etc. are known in the art. It is contemplated that handle attachment mechanism 162 could be molded for use with any of the myriad known handle types.

Yoke 152 is molded to join the cross pieces at living hinges 156. The living hinges 156 permit the cross pieces 154 (and attached blade assemblies 102) to tilt forward and backward during use. This feature is described in more detail below with reference to FIG. 6. The living hinges 156 can be created during molding by either using a uniform material with the hinges suitably thin or using differential molding such that a more flexible polymer exists at the point of the living hinges 156. Similarly, to provide greater flexibility in the cross pieces 154 double molding can be used so that the cross pieces 154 are more flexible than for example the yoke 152.

Blade assembly 102 has three primary parts, a razor blade 130, a cover 120 and a base 140. The cover 120 is unitarily molded as a single unit. The blade 130 has a cutting edge 132 and defines either a plurality of voids 134. It is within the scope and contemplation of embodiments of the invention to use blades with more or fewer voids 134 than shown. If fewer or more pins are used fewer or more voids can be defined.

The cover 120 has formed as part thereof a plurality of deformable pins 126 that pass through the voids 134 of the blade 130. The cover 120 also has formed as part thereof end caps 124 at either longitudinal end of the cover 120. In one embodiment, the end caps 124 have a generally L shaped cross section. In one embodiment, the short leg of the L provides a hard stop that prevents forward movement of the blade 130 once installed over the pins 126. By holding the blade 130 against the hard stops during manufacture constant cutting edge location is achieved independent of inconsistences that may arise in the manufacture of the blade itself. For example, the relative distance between the cutting edge and the voids may be different between two blades owing to the fact that the edge is typically ground after the voids are punched. Precision molding of the hard stops permits significant tolerance in the blade production including both the edge and the voids without negatively impacting the precision of the finished assembly.

The base 140 is unitarily molded to define a plurality of voids 144 to receive pins 126. Base 140 may also optionally be molded to define one or more sacrificial electrode pockets (shown in FIG. 3) to receive sacrificial electrodes 170. In one embodiment, the sacrificial electrodes 170 are aluminum spheres and the pockets are defined to be of a size that the sphere will pressure fit within the pocket. In one embodiment, the sphere has a diameter of 1 mm. Other shapes of sacrificial electrodes are also contemplated including but not limited to rectangular solids, toroids, discs and the like. Other embodiments may have the electrode pockets molded into the cover 120, but it is believed that ease of manufacture is enhanced with the electrodes 170 residing in the base 140. Molded as part of base 140 are a pair of deformable pegs 142, which during assembly pass through the voids 158 of cross pieces 154. A blade guard (not visible in this view) is also molded as part of base 140. The blade guards are discussed in more detail below.

To assemble blade assembly 102, the cover 120 is held in a fixture and the blade 130 is inserted such that the pins 126 pass through the blade. The hard stops 124 in conjunction with the pins 126 force the blade into a precise position. The sacrificial electrodes 170 (if present in the embodiment) are pressure fit into pockets in the base 140 and the base 140 is overlaid on the cover-blade combination such that the pins 126 pass through the voids 144 in the base 140. Pressure is applied to pins 126 to drive them into the plastic range of the material used such that the pins 126 are permanently deformed and hold the assembly 102 together as a unit. Notably, unlike prior art razor assemblies that often relied on heat welding or similar processes, here, no heat processing is required for assembly. The final position of the blade is achieved when the sandwich of the cover, blade and base is compressed. The hard stops 124 ensure precision and consistency between blade assemblies.

Figure 2:
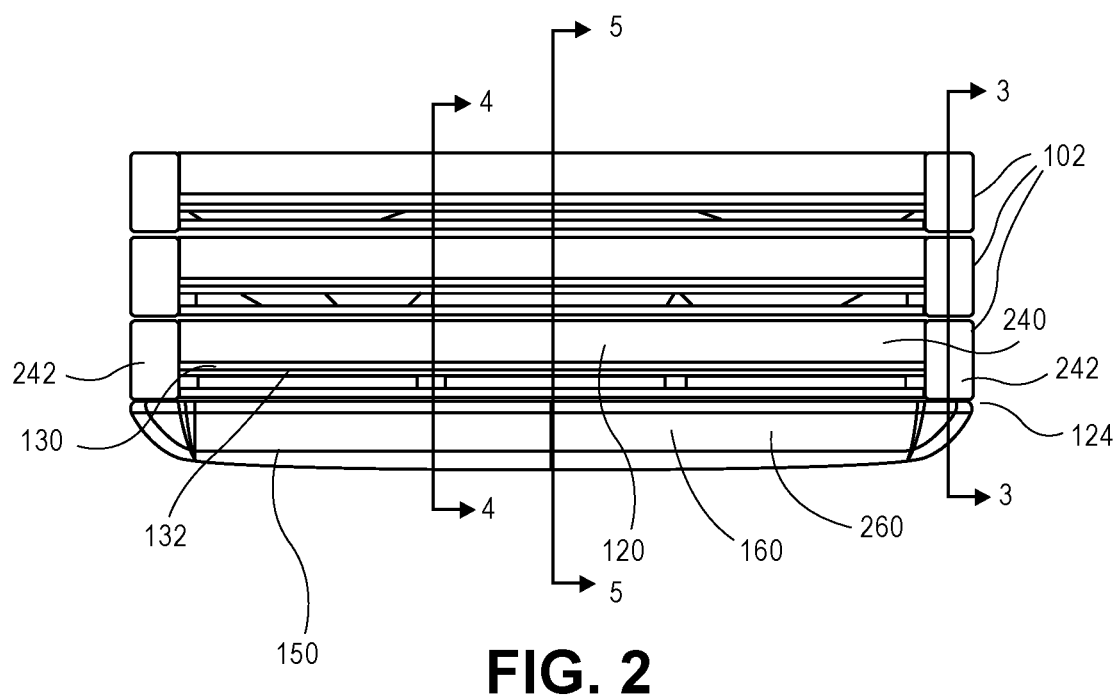
FIG. 2 is a plan view of the face of a shaving head in one embodiment of the invention.

FIG. 2 is a plan view of the face of a shaving head in one embodiment of the invention. In this embodiment, three identical blade assemblies 102 are coupled to bridge 150. As seen in this view, the leading platform 160 has a skin contact surface 260. As used herein, "skin contact surface" mean the area of the respective part that is expected to come in contact with a user's skin in the shaving path (aligned with the cutting edge of the blade) during normal use. Each cover 120 also has a skin contact surface. Particularly, the surface 240 that runs along razor blade 130 and lags cutting edge 132 is exposed in the shaving path and expected to contact a user's skin during shaving. One problem with plastic molded part is they tend to "stick" to the skin resulting in a skipping or pulling sensation during use. To alleviate this prior art razors have applied lubricating strips to the plastic parts to cause them to glide better. In one embodiment, the molds used to mold the bridge 150 and the blade covers 120 imparts a texture on the skin contacting surfaces of these parts. The texture of the skin contacting surfaces is in the range of 21-33 on the Verein Deutscher Ingenieure 3400 (VDI) scale. In one embodiment, the texture of all skin contacting surfaces in the shaving path is substantially the same. In one embodiment, the texture is 27 on the VDI scale. Table 1 shows the relevant VDI scale in comparison to other measurements of texture.

TABLE 1

VDI surfaces correspond to the following Ra Values and require the following drafting angles

| VDI 3400 | ISO, VDI, ASA | | | | SPI | | | | | |
|---|---|---|---|---|---|---|---|---|---|---|
| Charmilles | Ra = CLA = AA | | Rz | | | RMS | | | | |
| CH | µm | µ inch | µm | ISO/TC 213 | Tipo | µm | µ inch | DA-PA | DA-PC | DA-ABS |
| | 0.025 | 1 | | N1 | A1 | 0.022-0.043 | 0.5-1 | | | |
| | 0.05 | 2 | | N2 | A2 | −0.08 | 1-2 | | | |
| 0 | 0.1 | 4 | | N3 | A3 | −0.3 | 2-7 | | | |
| 1 | 0.11 | 4 | | | | | | | | |
| 2 | 0.12 | 5 | | | | | | | | |
| 3 | 0.14 | 6 | | | | | | | | |
| 4 | 0.16 | 6 | | | | | | | | |
| 5 | 0.18 | 7 | | | | | | | | |
| 6 | 0.2 | 8 | | N4 | B1 | 0.3-0.324 | 7-9.75 | | | |
| 7 | 0.22 | 9 | | | B2 | −0.422 | 9.75-12 | | | |
| 8 | 0.25 | 10 | | | | | | | | |
| 9 | 0.28 | 11 | | | B3 | −0.52 | Dez-15 | | | |
| 10 | 0.32 | 13 | | | | | | | | |
| 11 | 0.35 | 14 | | | C1 | 0.52-0.65 | 15-20.5 | | | |
| 12 | 0.4 | 16 | 1.5 | N5 | | | | 0 | 1 | 0.5 |
| 13 | 0.45 | 18 | | | C2 | −0.89 | 20.5-26 | | | |
| 14 | 0.5 | 20 | | | | | | | | |
| 15 | 0.56 | 22 | 2.4 | | | | | 0.5 | 1 | 0.5 |
| 16 | 0.63 | 25 | | | C3 | −1.125 | 26-32 | | | |
| 17 | 0.7 | 28 | | | | | | | | |
| 18 | 0.8 | 32 | | N6 | D1 | 1.125-1.385 | 26-32 | 0.5 | 1 | 0.5 |
| 19 | 0.9 | 36 | | | | | | | | |
| 20 | 1 | 40 | | | D2 | | 32- | | | |
| 21 | 1.12 | 45 | 4.7 | | | | | 0.5 | 1 | 0.5 |
| 22 | 1.26 | 50 | | | | | | | | |
| 23 | 1.4 | 56 | | | | | | | | |
| 24 | 1.62 | 63 | 6.5 | N7 | | | | 0.5 | 1.5 | 1 |
| 25 | 1.8 | 72 | | | | | | | | |
| 26 | 2 | 80 | | | | | | | | |
| 27 | 2.2 | 88 | 10.5 | | | | | 1 | 2 | 1.5 |
| 28 | 2.5 | 100 | | | | | | | | |

TABLE 1-continued

VDI surfaces correspond to the following Ra Values and require the following drafting angles

| VDI 3400 Charmilles CH | ISO, VDI, ASA Ra = CLA = AA | | Rz | | SPI | | | | | |
|---|---|---|---|---|---|---|---|---|---|---|
| | μm | μ inch | μm | ISO/TC 213 | Tipo | μm | μ inch | DA-PA | DA-PC | DA-ABS |
| 29 | 2.8 | 112 | | | | | | | | |
| 30 | 3.2 | 125 | 12.5 | N8 | D3 | | | 1.5 | 2 | 2 |
| 31 | 3.5 | 140 | | | | | | | | |
| 32 | 4 | 160 | | | | | | | | |
| 33 | 4.5 | 180 | 17.5 | | | | | 2 | 3 | 2.5 |
| 34 | 5 | 200 | | | | | | | | |
| 35 | 5.6 | 224 | | | | | | | | |
| 36 | 6.3 | 250 | 24 | N9 | | | | 2.5 | 4 | 3 |
| 37 | 7 | 280 | | | | | | | | |
| 38 | 8 | 320 | | | | | | | | |
| 39 | 9 | 360 | 34 | | | | | 3 | 5 | 4 |
| 40 | 10 | 400 | | | | | | | | |
| 41 | 11.2 | 448 | | | | | | | | |
| 42 | 12.6 | 500 | 48 | N10 | | | | 4 | 6 | 5 |
| 43 | 14 | 560 | | | | | | | | |
| 44 | 16 | 640 | | | | | | | | |
| 45 | 18 | 760 | 69 | | | | | 5 | 7 | |

Figure 3:
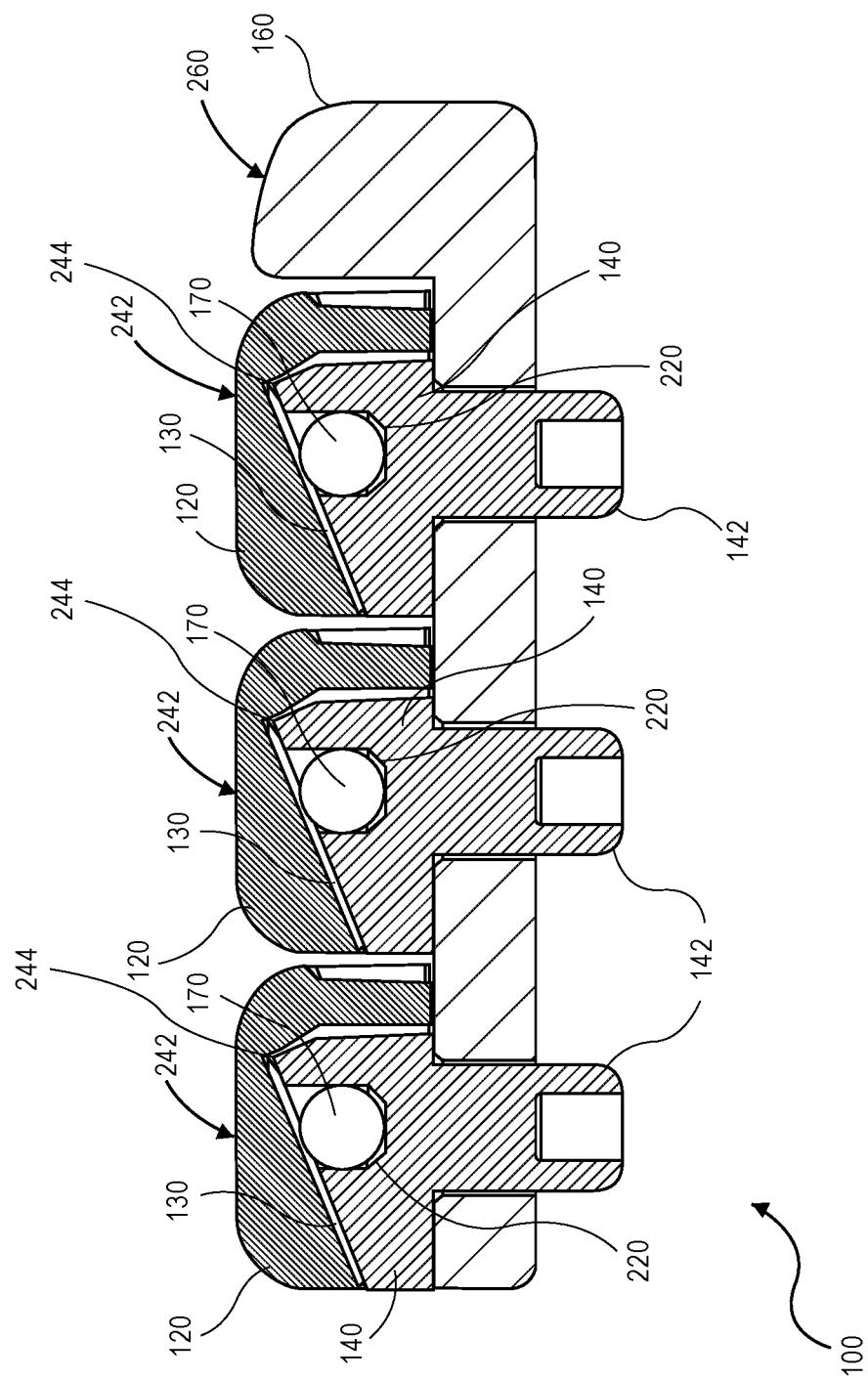
FIG. 3 is a sectional view of a shaving head in an embodiment of the invention taken as indicated in FIG. 2.

DA-PA = Drafting Angle for Polyamide
DA-PC = Drafting Angle for Polycarbonate
DA-ABS = Drafting Angle for Acrilnitrile-Butadiene-Styrol FIG. 3 is a sectional side view of a shaving head in an embodiment of the invention taken as indicated in FIG. 2. In this view, the hard stops 244 that prevent the forward movement of blades 130 and ensure the cutting edge of each blade is precisely positioned during manufacture can be seen. Also, in this view, the sacrificial electrode pockets 220 can be seen. Pockets 220 are sized to receive and retain under pressure sacrificial electrodes 170. That is, in the case of a spherical electrode, cross dimension of the pocket 220, will be slightly less than the diameter of the sphere. For example, in one embodiment, the electrode 170 has a diameter of 1 mm and the pocket has a cross dimension of 0.97 mm. While in some embodiments, the pocket is roughly cylindrical, other shape pockets such as square pockets may be used. Sacrificial electrodes 170 increase blade 130 longevity by reducing oxidation of the blade during use in aqueous environments. For proper protection, a good contact between the electrode 170 and the blade 130 must be maintained. To that end, the depth of the pocket 220 is selected to ensure that the electrode 170 will protrude slightly to ensure contact with the blade 130 when the assembly 102 is compressed together.

In one embodiment, the electrode pockets 220 are molded to be above the pegs 142 of base 140. As used herein, "above" is defined relative to the shaving plane. In other embodiments, the one or more pockets 220 can be molded in other locations along the length of base 140. In one embodiment, the pegs 142 are molded to have hollow ends. The hollow ends enhance the ease of pressure based deformation to cause the blade assemblies 102 to be retained on the bridge 150.

Figure 4:
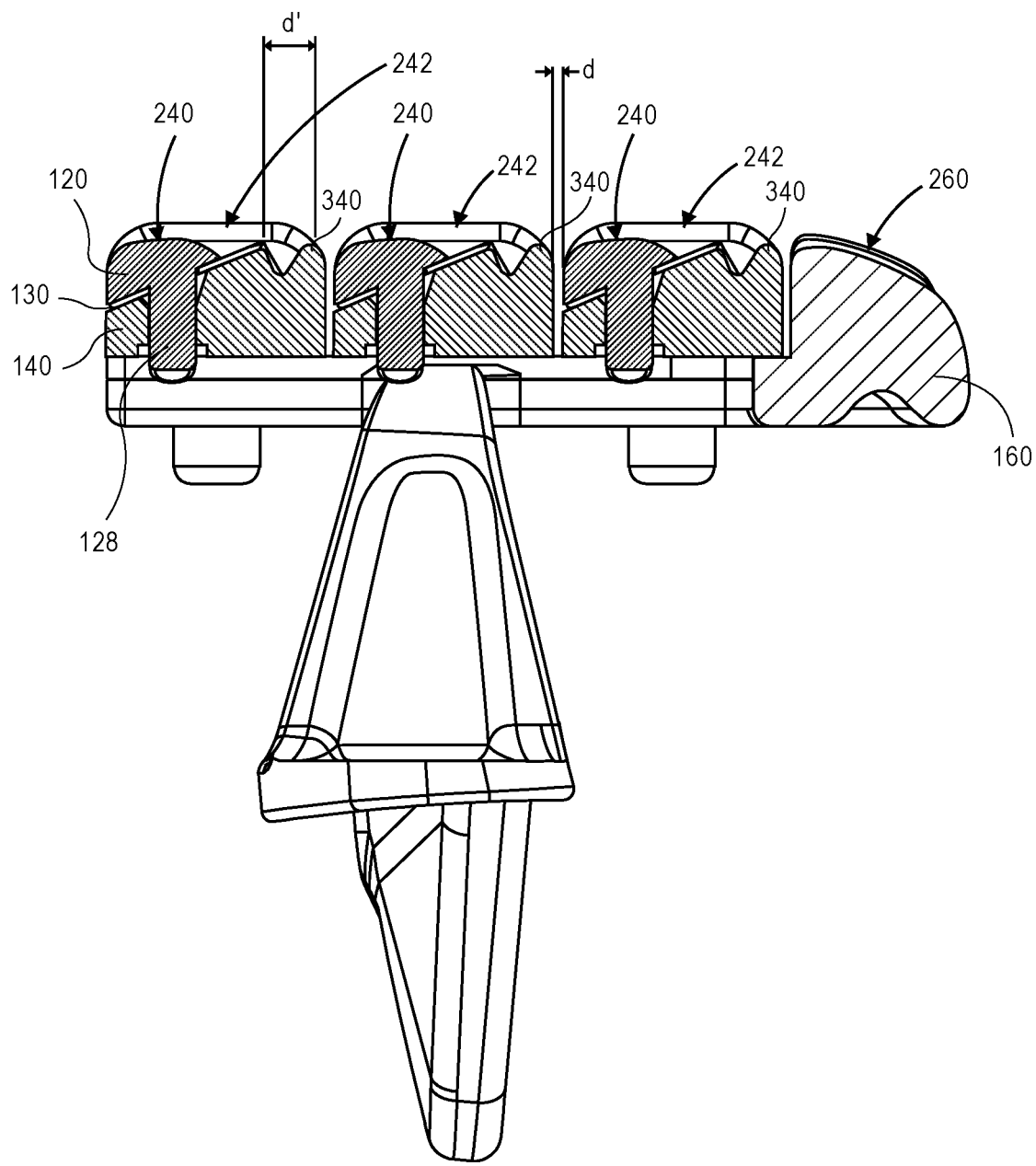
FIG. 4 is another sectional view of a shaving head in an embodiment of the invention taken as indicated in FIG. 2.

FIG. 4 is another sectional side view of a shaving head in an embodiment of the invention taken as indicated in FIG. 2. In this view, the pins 128 can be seen penetrating blade 130 and base 140. In this view the blade guard formed as part of the base is visible. The blade guard 340 is molded to reside a distance d' ahead of the cutting edge 132 of the blade 130 coupled thereto. In some embodiments, d' is in the range of 0.7-0.8 mm. In one embodiment, d' is approximately 0.77 mm. Also in this view the relative position of skin contact surfaces 240 and 260 are visible, skin contact surfaces 240 and 260 may be at, above, or below the shaving plane.

Figure 5A:
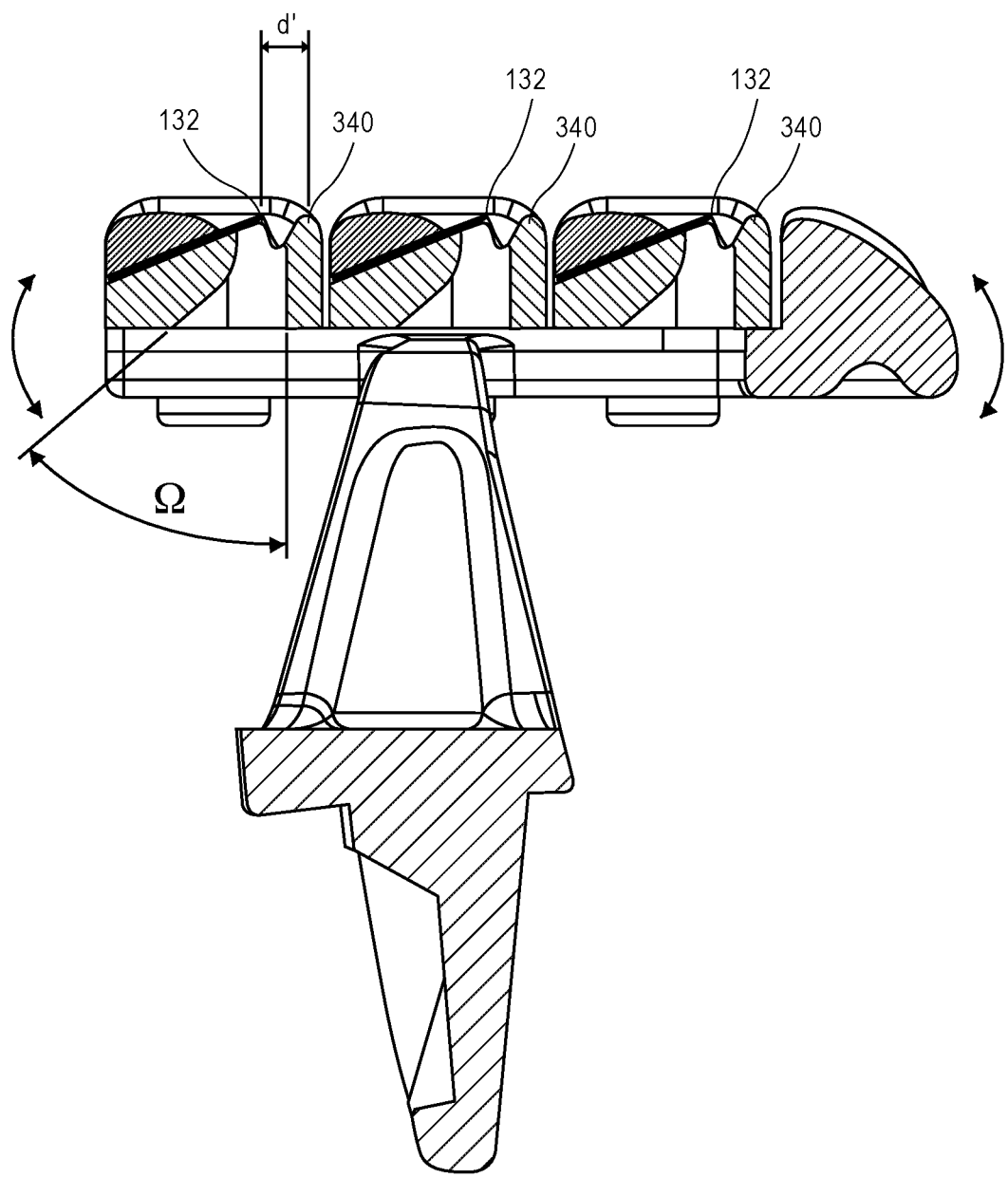
FIG. 5A is another sectional view of a shaving head in an embodiment of the invention taken as indicated in FIG. 2.

FIG. 5A is another sectional side view of a shaving head in an embodiment of the invention taken as indicated in FIG. 2. Again the spacing d' between the blade guard 340 integrally molded as part of base 140 is visible. Additionally, base 140 defines a wash through channel that open in an acute angle Ω. In some embodiment, Ω is in the range of 30 to 70 degrees. In one embodiment, the wash through channel opens at an angle of approximately 50 degrees. In this view the cross pieces are shown in an unflexed orientation.

Figure 5B:
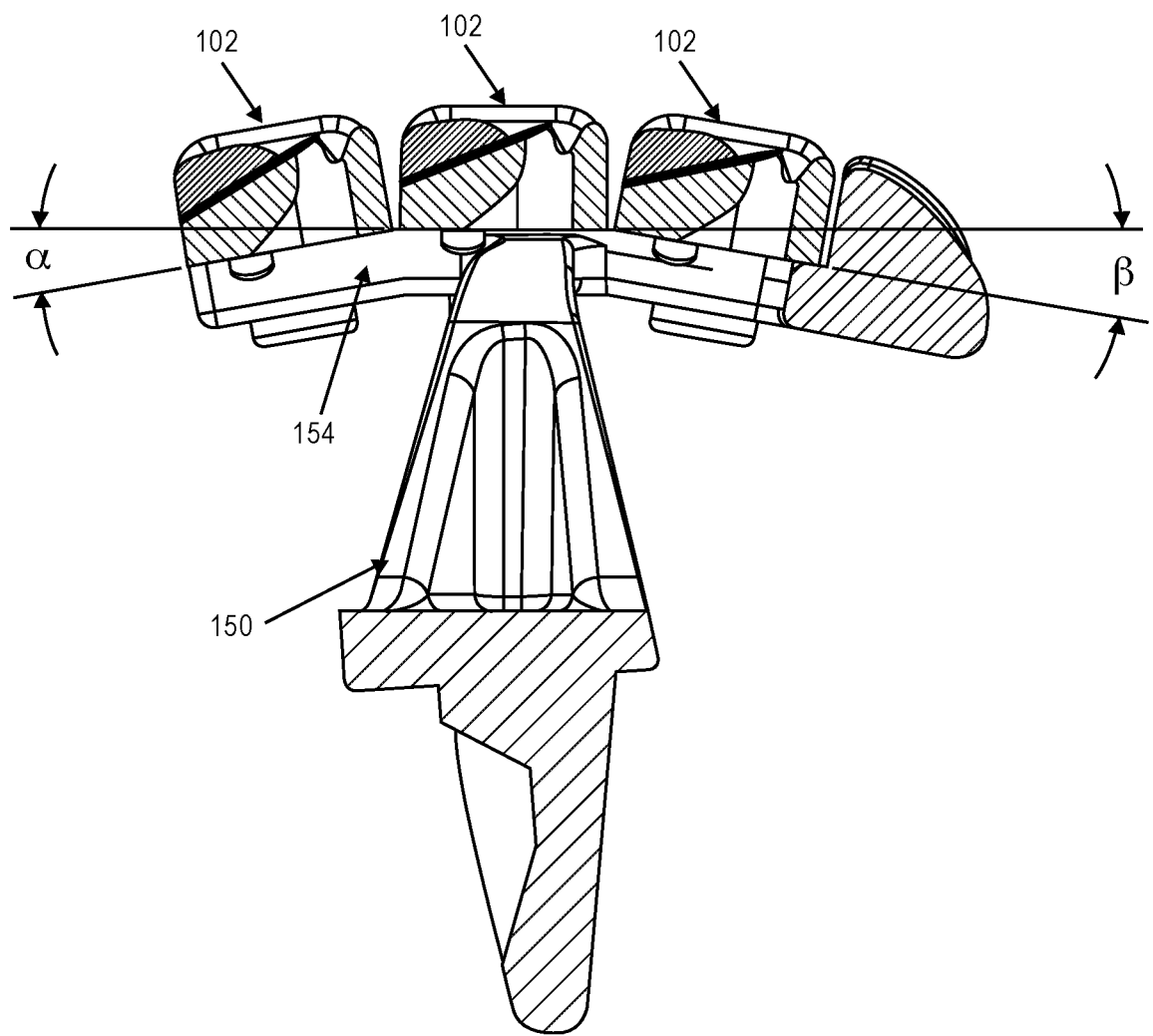
FIG. 5B is sectional side view of the shaving head of FIG. 5A in a convex orientation.

FIG. 5B side views of a shaving assembly an embodiment of the invention, convex orientation. A cross member 154 is coupled (integrally formed with) to a bridge 150 and retains independent blade assemblies 102. The bidirectional arrows in the figure are indicative of the ability of the cross members 154 to flex around living hinge 156 (not visible in FIGS. 5A and 5B) into a convex orientation. The convex orientation assists in shaving a tight area, such as under a user's nose. In the shown embodiment, leading platform 160 is formed with an appropriate texture on its skin contacting surface.

FIG. 5B shows cross member 154 flexed in a convex orientation leading about living hinge 156. As previously noted, this orientation makes it easier to get into tight spaces, such as around a user's nose. Notably, leading platform 160 provides leverage to facilitate this flexion as a user presses the assembly against the area to be shaved wherein the leading platform 160 provides a lever arm to initiate bending about living hinge 156. The flexion angles α and β cause the blades of the individual blade assemblies 102 to adopt different approach angles relative to the user's skin. This permits more effective shaving in tight places.

Figure 6:
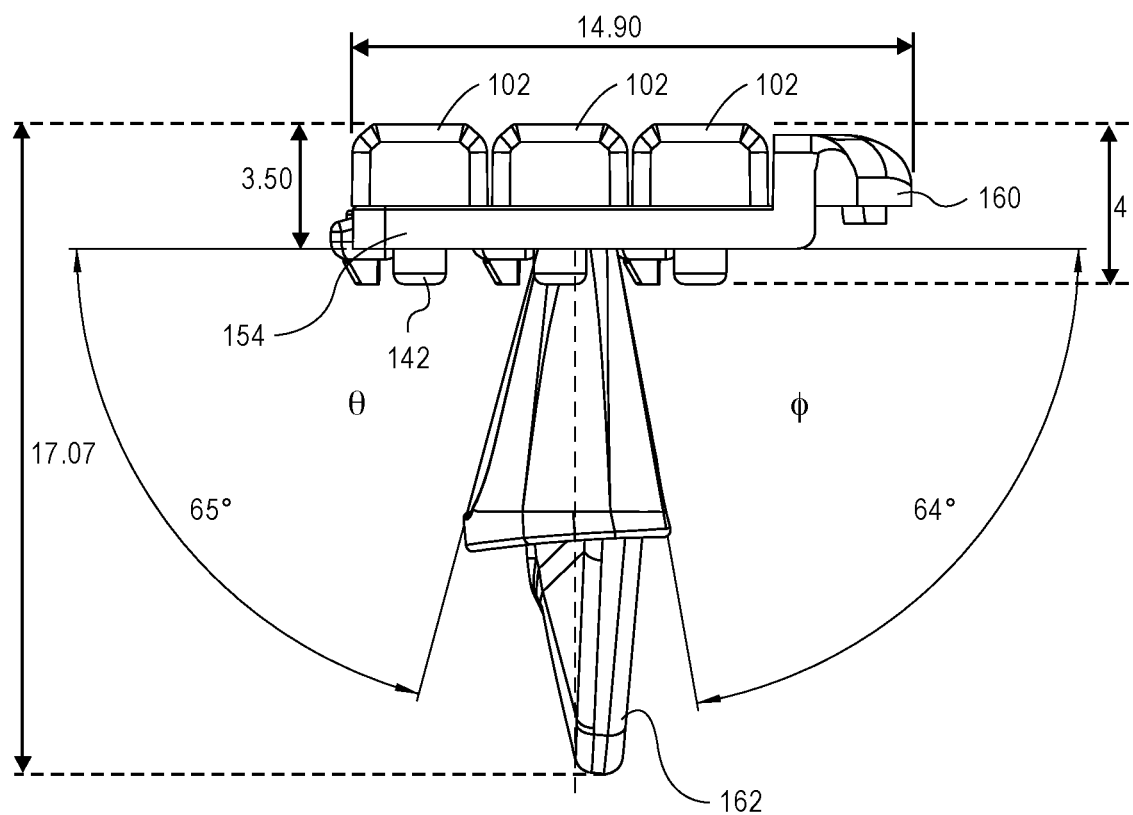
FIG. 6 is a side view of shaving head of one embodiment of the invention.

FIG. 6 is a side view of shaving head of one embodiment of the invention. Certain dimensions of one embodiment in millimeters are shown. In one embodiment, living hinges 156 allow cross pieces 154 and blade assemblies coupled thereto to pivot forward through an arc φ, which in one embodiment is 64 degrees. For purposes of comparison The Gillette Fusion has a maximum pivot arc of 55 degrees in a single direction. The same living hinges permit blade assemblies 102 and cross piece 154 to pivot backwards in arc θ of, for example, 65 degrees. In other embodiments, φ may be in the range of 30 to 75 degrees and θ may be selected to be, for example, also in the range of 30 to 70 degrees. The forward and backward arcs are defined from a rest position, the rest position being the position of the head when force is not applied. However, a greater arc of pivot increases the range of angles of the handle over which the blades of the assemblies 102 will remain on a user's skin in an effective position. In one embodiment, cross pieces 154 are also flexible, such that the overall face of the razor may flex as described above in connection with FIGS. 5A-5B. In an alternative embodiment, cross pieces 154 may not be flexible such that while the head can pivot about the living hinges the all blade assemblies are retained in a single shaving plane.

Figure 7:
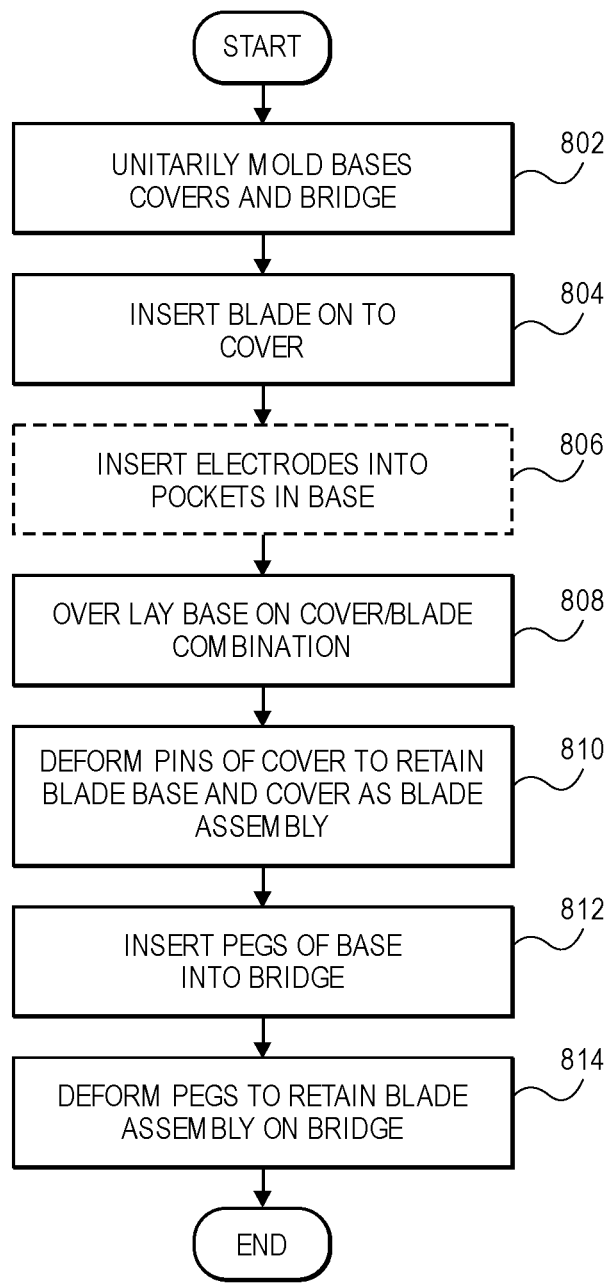
FIG. 7 is a flow diagram of a process of manufacturing the shaving assembly in accordance with one embodiment of the invention.

FIG. 7 is a flow diagram of a process of manufacturing the shaving assembly in accordance with one embodiment of the invention. At block 702, the covers, bases and bridge are each unitarily molded. It will be understood that each will be molded in its respective mold and that such molding need not occur concurrently. Rather commercial quantities of each part can be produced serially, or in parallel on different molding equipment. The parts may be molded of the same or different materials. As noted above double molding can be used to make some parts of e.g. the living hinge and cross pieces more flexible and other parts more rigid. In some embodiment, the molds are fabricated to impart a texture on the skin contacting surfaces is in the range of 21-33 on the VDI scale. In one embodiment, the texture of all skin contacting surfaces is substantially the same. In one embodiment, the texture is 27 on the VDI scale.

Some embodiments include the molding of electrode pockets into either the base or the cover. The bases are also molded to have deformable pegs to facilitate attachment to the bridge. In some embodiments, at least a distal portion of the pegs are hollow. The covers are molded to include a plurality of deformable pins that facilitate attachment of the cover-blade and base as a blade assembly. The covers are also molded with hard stops at either end to facilitate precise blade positioning.

At block 704, the blade is inserted over the pins of the cover. In scale manufacturing this is expected to be performed automatically, e.g., robotically while the cover is held within a fixture. The blade is held by the pins and between the stops so that is cannot easily move during subsequent manufacturing stages. If electrode pockets are provided, at block 706, sacrificial electrode are inserted in the pockets with a pressure fit so that they remain in the pocket regardless of the orientation of e.g. the base in which the pocket is molded. At block 708 the base is overlaid on the cover blade combination such that the pins of the cover penetrate voids in the base. At block 710, pressure is then applied to the sandwich of the blade between the cover and the base to permanently deform the pins causing the blade, base and cover to be retained as a completed blade assembly. The pressure also ensures good contact between the blade and electrodes, if present. During this assembly process, no heat processes are required, either to temporarily hold the blade in a precise position or for the permanent formation of the blade assembly. By elimination heat processing, e.g. welding, fusing etc., the speed of manufacture is increased at a reduced cost.

At block 712, the pegs of the base of a completed blade assembly are inserted into voids in the cross pieces of the bridge. Then at block 714, the pegs are deformed under pressure to retain the blade assembly on the bridge. Again, no heat processes are required. It is expected that in some embodiments multiple blade assemblies will be installed on the bridge concurrently. In commercial production is largely expected to be performed automatically with a set of blade assemblies held in a fixture and the bridge install on the set of assemblies in one operation.

While explicit dimensions are shown and described in connection with various embodiments, it is within the scope and contemplation to change those dimensions. Thus, the actual dimensions may be larger or smaller than the dimensions detailed. However, it has been found that the dimensions shown yield a quality product providing an exceptional shave.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A shaving assembly comprising:
a razor blade;
a base member in which the razor blade resides, the base member unitarily molded to include an integral blade guard that resides ahead of a cutting edge of the razor blade in a cutting direction, the base member defining a wash through channel opening at an angle in the range of 30-70 degrees;
a blade cover unitarily molded to retain the razor blade in a sandwich with the base member, wherein the sandwich held together by a plurality of deformable pins penetrating from the blade cover through the razor blade and the base member wherein the cover has a skin contact surface, and wherein the skin contact surface residing in a path traversed, in use, by an exposed edge of the blade has a texture in the range of 21-33 on the Verein Deutscher Ingenieure 3400 (VDI) scale.

2. The shaving assembly of claim 1 wherein a distance between the blade guard and the cutting edge is in the range of 0.7 to 0.8 millimeters.

3. The shaving assembly of claim 1 wherein the base member defines at least one pocket to retain a sacrificial electrode.

4. The shaving assembly of claim 3 further comprising a sacrificial electrode.

5. The shaving assembly of claim 4 wherein the sacrificial electrode is spherical.

6. The shaving assembly of claim 1 wherein the pressure deformable pins are molded as part of the unitarily molded blade cover.

7. The shaving assembly of claim 1 wherein the unitarily molded blade cover has molded as part thereof a pair of hard stops that reside at either end of the razor blade and precisely limit a position of the razor blade within the cover by imposing a definitive forward limit on the cutting edge of the razor blade.

8. The shaving assembly of claim 1 wherein each blade guard has a texture in the range of 21-33 on the Verein Deutscher Ingenieure 3400 (VDI) scale.

9. The shaving razor of claim 1 wherein the angle of the wash through channel opening is in the range of 45-55 degrees.

10. A shaving razor comprising:
- a unitarily molded bridge having a leading platform couplable to a handle and a first and a second cross member each molded to extend substantially perpendicularly to the leading platform, each cross member defining a plurality of bores;
- a plurality of base members, each base member unitarily molded and having a first peg and a second peg, the first peg and second peg residing in bores in the first and second cross member respectively;
- a plurality of razor blades, one blade of the plurality residing on each base of the plurality of bases;
- a plurality of blade covers each unitarily molded and engaging respective blades of the plurality of razor blade and retaining the respective blades on respective bases of the plurality of base members;
- wherein each base defines a wash through channel opening at an angle in the range of 30-70 degrees; and
- wherein each cover of the plurality of blade covers and the leading platform have a skin contact surface, and wherein the skin contact surfaces residing in a path traversed, in use, by an exposed edge of the blade have a texture in the range of 21-33 on the Verein Deutscher Ingenieure 3400 (VDI) scale.

11. The shaving razor of claim 10 wherein each cover of the plurality of blade covers has molded as part thereof a plurality of pressure deformable pins that penetrate the respective blade and deform to retain the respective blade on the respective base.

12. The shaving razor of claim 10 wherein each base member of the plurality of base members has molded as part thereof a blade guard that resides ahead of the respective blade after the shaving razor is assembled.

13. The shaving razor of claim 12 wherein a distance between each blade guard and an associated blade cutting edge is in the range of 0.7 to 0.8 millimeters.

* * * * *